MICROWAVE LOGIC SYSTEM

Filed Oct. 22, 1965

INVENTOR
RODGER L. GAMBLIN

BY Ronald J. Clark
ATTORNEY

United States Patent Office 3,452,212
Patented June 24, 1969

3,452,212
MICROWAVE LOGIC SYSTEM
Rodger L. Gamblin, Vestal, N.Y., assignor to International Business Machines Corporation, Armonk, N.Y., a corporation of New York
Filed Oct. 22, 1965, Ser. No. 500,973
Int. Cl. H03k *17/00;* H01f *27/42*
U.S. Cl. 307—88 10 Claims

ABSTRACT OF THE DISCLOSURE

A plurality of ferrite elements having a toroidal shape and operating at the gyromagnetic resonant frequency, and combined to provide logical functions. Each element may be switched to either magnetic state in response to input signals representing logical variables. A microwave signal samples the magnetic state of the elements.

This invention relates in general to an improved computer logic system and, more particularly, to a computer logic system employing a plurality of ferriresonant absorption elements.

An absorption element employing a circularly polarized magnetic core, a helical coil wrapped thereon, and a source of microwaves connected to one side of the coil is disclosed in a co-pending application entitled "Ferriresonant Memory System" by R. L. Gamblin et al. Serial Number 500,941 and assigned to the assignee of the instant invention.

It is an object of the instant invention to provide an improved computer logic device having reduced reaction time to provide a faster logical answer to a plurality of Boolean variable inputs.

It is another object of the instant invention to provide an improved computer logic device employing the combination of a plurality of circularly polarized ferrite elements switched to either magnetized state to represent a complex Boolean function and a microwave signal to sample the magnetized state of the ferrites.

It is a further object of the instant invention to provide an improved computer logic device employing a magnetized ferrite element and a latch back drive wire to alter or latch up the magnetic state of the ferrite element.

These and other objects are accomplished by the combination of a microwave absorption (MA) element having an associated source of microwave signals, a helical coil connected to the source and wound around the MA element, a detector and sense amplifier connected to the other end of the coil to sense the presence of microwave signals and to drive current back through the MA element to latch the element to a single state, or to drive current through an associated MA element to represent the logical function of the first MA element.

Figure 1:
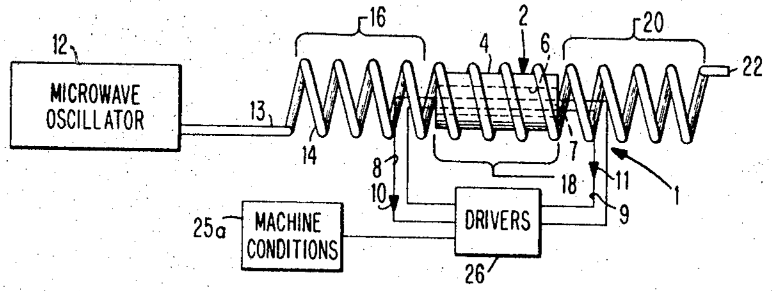
Figure 2:
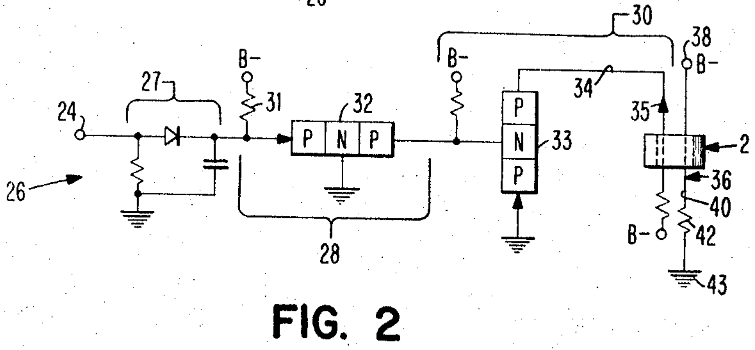
Figure 3:
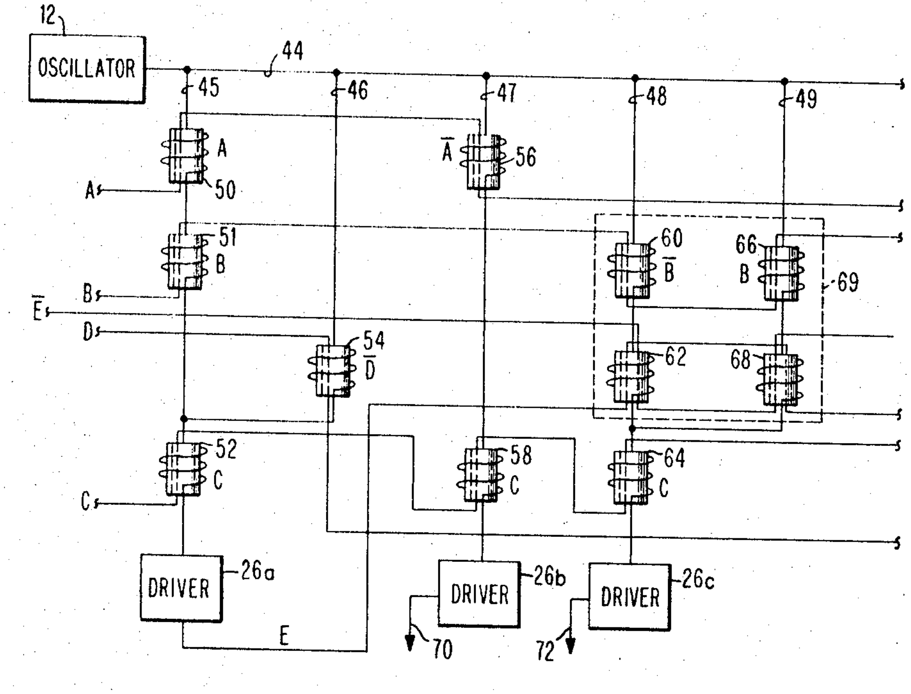

The foregoing and other objects, features and advantages of the invention will be apparent from the following more particular description of preferred embodiments of the invention, as illustrated in the accompanying drawings; wherein FIG. 1 is a schematic view showing a single microwave absorption element;

FIG. 2 is a schematic view showing the feedback path through which a MA element is effectively latched; and FIG. 3 shows a plurality of MA elements disposed to perform logical functions.

Referring to FIG. 1, there can be seen a MA element 1 including a cylindrically shaped ferrite toroid 2 having an integral gyromagnetic absorption characteristic when exposed to an external magnetic field. The toroid 2 is formed with an outer wall 4 and an inner cylindrically shaped wall 6. The wall 6 forms an axial bore 7. A pair of drive lines 8 and 9 thread the bore 7 in opposite electrical senses as indicated by the arrows 10 and 11 respectively. A Gunn effect or a other suitable microwave oscillator 12 is connected to one end 13 of a helical coil 14, which coil is divided into a plurality of sections. A first section 16 of the coil 14 is an input impedance matching section. A second section 18 of the coil 14 is the resonant absorption section and a third section 20 is an output impedance matching section. An end 22 of the portion 20 is connected to a terminal 24 shown in FIG. 2. Depending on the magnetization state of the MA element 2, microwave energy passes from the oscillator 12 to the circuit shown in FIG. 2. A drive pulse applied to the line 8 by a driver circuit 26 drives the toroid 2 into a first stable state of remnant magnetization wherein the resonant absorption phenomenon occurs between the magnetic field generated by a circularly polarized signal passing down the helical coil 14 and the electrons precessing within the ferrite 2. A drive pulse applied to the drive line 9 drives the toroid 2 into a second opposite stable state of remnant magnetization wherein resonant absorption is prevented since the electrons in the ferrite toroid are now precessing in the opposite sense. With the use of magnetically soft ferrites, a change in magnetic states is still achieved by the drive pulses but the states are not stable. More specifically, the first drive pulse prevents the transmission of microwaves through its associated toroid for only a short time after the drive pulse is removed. An opposite magnetic state is reached by the second drive pulse to permit transmission of a microwave signal through the associated toroid. In a second embodiment, the drive wires are not controlled by external circuits, such as a machine condition circuit 25*a*, but rather by the drive circuit itself as will be described hereinafter. Additionally, a single drive wire with a biased core is shown in FIG. 2 as a replacement for the two wire drive systems shown in FIG. 1.

FIG. 2 shows a standard sense amplifier and driver circuit 26 employing a microwave rectifier section 27, a detection stage 28 and a drive stage 30. The circuit 26 indicates when a microwave signal successfully travels through all the MA elements in its associated branch line. A microwave signal generated by the oscillator 12 is circularly polarized in one direction by the helix 14. When resonant absorption occurs, a substantially low level signal reaches the circuit 26 (FIG. 2), which signal fails to exceed the current bias level supplied by a resistor 31 to transistor 32 does not turn on. When no resonant absorption occurs, the rectified microwave signal generates a sufficient current to overcome the threshold current and thereby turns on the transistor 32. The turning on of the transistor 32 turns off a drive transistor 33 which furnishes current to a selected drive wire 34. The turning off of the transistor 33 cuts off current through the toroid 2 in the direction indicated by the arrowhead 35. This current normally holds the magnetic state of the toroid 2 so absorption occurs. Without the application of this drive current, a bias network 36 holds the toroid 2 switched to its second stable state in which no absorption occurs. The bias network 36 comprises a source of positive potential 38, a drive wire 40, a bias resistor 42 and a ground connection 43. The polarity of the drive lines 36 and 34 may be as shown in FIG. 2 or reversed as shown with respect to elements 54, 56 and 60 in FIG. 3.

In operation, the device shown in FIG. 2 operates similarly to a relay. Microwave energy passes through the helix 14, not shown, associated with a toroid 2. The circuit 26 detects the presence of this microwave signal and switches the magnetic state of another core, as shown with respect to driver 26*a* in FIG. 3, preventing further microwave transmission or allowing microwave transmissions depending on the direction in which the drive wire 34 is threaded.

Referring to FIG. 3, there can be seen a plurality of MA elements interconnected to perform certain basic logical operations. The selected logic operations shown are not a limitation as to the capability of the device but rather by example. The microwave oscillator 12 generates a signal at the absorption resonant frequency of the MA elements employed in FIG. 3. A first strip line 44 is connected to the output of the oscillator 12 and to a plurality of branch lines 45 through 49. A plurality of MA elements 50, 51 and 52 are connected in series with the branch line 45 by connecting the ends 13 and 22 of the corresponding coils 14 together so as to maintain a uniform direction of the helical winding. A sense amplifier and driver circuit 26*a* is connected to the element 52. The elements 50, 51 and 52 are connected to recognize a possible AND function represented by the Boolean variables A, B and C represented by the drive wires designated A, B and C respectively. Means, not shown, supply the Boolean variables. A positive pulse represents the "true" condition of a Boolean variable, for example A, and a negative pulse represents the "complement" condition of the same Boolean variable, A.

An element 54 is connected in parallel with the MA elements 50 and 51 and is threaded with a drive wire D performing a logical OR function therewith. An element 56 is connected in series with an element 58 and a sense amplifier and driver circuit 26*b*. Elements 60 and 62 are connected in series with an element 64 and with a sense amplifier 26*c*. An element 66 is connected in series with the element 68 and this series connection is connected in parallel with the elements 60 and 62 forming an AND/OR circuit 69.

The elements shown in FIG. 3 are divided into partial rows and columns. Rows refer to those elements shown horizontally and generally interconnected by drive lines. Row D is the exception and comprises the drive line D and a drive line E emanating from the circuit 26*a*. Columns refer to those row elements linked by one of the common branch lines 45 through 49. More specifically, each of the branch lines 45 through 49 comprises a continuous helical coil 14. The coil 14 operates the best when wound around its associated toroids 2, but for satisfactory operation the coil 14 need only to be placed adjacent the toroids 2 to have gyromagnetic resonant absorption to occur. The direction in which each drive line threads its respective elements determines the transmission state for a positive pulse. For example, drive line A threads the element 50 from the bottom to the top and the element 56 from the top to the bottom. A positive pulse sets the element 50 to its transmission state and sets the element 56 to its absorption state. A negative pulse sets the states opposite to that set by the positive pulse. Accordingly, the element 50 represents the Boolean variable A and the element 56 represents the Boolean variable $\overline{A}$. The remaining elements follow the same rules and are marked accordingly except for the elements 62 and 68 which merit the following special attention. A pair of drive wires E and $\overline{E}$ thread the elements 62 and 68 according to the foregoing convention. Only positive pulses are applied to these lines since the driver circuit 26*a* is not shown having bi-directional capabilities. A still further change is through the use of the biasing networks shown in FIG. 2 and a single unidirectional drive line 34.

In operation, the circuit shown in FIG. 3 performs basic logical operations in the same manner as relays but with increased operating speed. Basically, the drive lines A through E switch the MA elements to one of their stable states to represent a logical function. The oscillator 12 is then turned on and microwaves proceed down the strip line 44 and into all the branch circuits connected therewith. Power levels are taken into consideration for directing a suitable power level into each branch required to perform the assigned logical decision. For example, a tapered strip line 44 and mismatched helical coils comprise one suitable method of achieving suitable power distribution from the strip line 44. In order for the circuit 26*a* to develop a pulse on its output drive line E the following logical function must be satisfied; ABC or $\overline{D}$C. In order for the circuit 26*b* to develop a pulse on output line 70, the following logical function must be satisfied $\overline{A}$C. In oder for the circuit 26*c* to develop a pulse on an output line 72, the following logical function must be satisfied $\overline{B}$EC or B$\overline{E}$C.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer logic system comprising,
a plurality of cylindrically shaped ferrite toroids,
each of said toroids being formed with an outer wall and a central bore,
first means for selectively magnetizing each of said toroids to a first stable state of remnant magnetization or to a second stable state of remnant magnetization,
one stable state of each toroid representing the true condition of a logical function and the other stable state of the same toroid representing the complement of the same logical function,
each of said toroids having a gyromagnetic resonant absorption frequency,
a source of microwave signals operating substantially at said frequency,
a helical coil wound around said outer wall of each toroid,
a first group of said coils being connected to said source,
a second group of said coils being connected to said first group,
a third group of said coils being connected to said second group and being interconnected together, and
second means connected to said third group for indicating the absorption of said microwave signals and for indicating the passing of said microwave signals through said interconnected coils.

2. A computer logic device comprising,
a ferrite toroid being formed with an inner bore and an outer wall,
first means for selectively magnetizing said toroid to a first stable state of remnant magnetization or to a second stable state of remnant magnetization,
said magnetized ferrite having a gyromagnetic resonant absorption frequency,
a source of microwave signals operating substantially at said frequency,
second means placed adjacent said toroid and connected to said source for circularly polarizing said microwave signals in a single sense of rotation,
said toroid in said first state absorbing said microwave signals and said toroid in said second state passing said microwave signals substantially undiminished therethrough,
third means connected to said second means for indicating the absorption of said microwave signals and the passing of said microwave signals and for generating a drive pulse in response to the passing of said microwave signals, and
drive means responsive to said drive pulse for latching up the state of the device.

3. A computer logic device as recited in claim 2, wherein said second means is a helical coil and said coil is wound on the outer wall of said toroid.

4. A computer logic system comprising, a plurality of cylindrically shaped ferrite toroids, each of said toroids being formed with an outer wall and a central bore, first means for selectively magnetizing each of said toroids to a first state of magnetization and to an opposite state of magnetization, one state of each toroid representing the true condition of a logical function and said opposite state of the same toroid representing the complement of the same logical function, each of said toroids having a gyromagnetic resonant absorption frequency, a source of microwave signals operating substantially at said frequency, a helical coil wound around said outer wall of each toroid, a first group of said coils being connected to said source, a second group of said coils being connected to said first group, a third group of said coils being connected to said group and being interconnected together, and said interconnected groups forming a plurality of branches, second means connected to said third group for indicating the absorption of said microwave signals and for indicating the passing of said microwave signals through said interconnected group.

5. A computer logic system as recited in claim 4, wherein said second means generates an output drive signal for indicating the passage of said microwave signals through each branch, and said drive signal forming the logical function of some other toroid in one of said groups.

6. A ferriresonant logic system comprising, a plurality of ferrite toroids being formed with an inner bore and an outer wall, first means for selectively magnetizing each of said toroids to a first state of magnetization and to an opposite state of magnetization, each of said magnetized toroids having a gyromagnetic resonant absorption frequency, a source of microwave signals operating substantially at said frequency, a continuous helical coil wrapped around said outer wall of each toroid and connected to said source for circularly polarizing said microwave signals in a single sense of rotation, one state of magnetization of each toroid representing the true condition of a logical function and the opposite state of magnetization in the same toroid representing the complement of the same logical function, said toroid in one state absorbing said microwave signals and said toroid in said opposite state passing said microwave signals substantially undiminished therethrough, and second means connected to said coil for indicating the absorption of said microwave signals and the passing of said microwave signals.

7. A ferriresonant logic system as recited in claim 6, wherein each of said toroids is selectively magnetized to a first stable state of remnant magnetization or to a second opposite stable state of remnant magnetization.

8. A ferriresonant logic system comprising, a plurality of ferrite toroids being formed with an inner bore and an outer wall, first means for selectively magnetizing each of said toroids to a first state of magnetization or to an opposite state of magnetization, each of said magnetized toroids having a gyromagnetic resonant absorption frequency, a source of microwave signals operating substantially at said frequency, a helical coil wrapped around said outer wall of each toroid and being formed with a first end and a second end, one state of magnetization of each toroid being representative of the true condition of a logical function and the opposite state of magnetization in the same toroid being representative of the complement of the same logical function, said toroid in one state absorbing said microwave signals and said toroid in said opposite state passing said microwave signals substantially undiminished therethrough, said first end of each coil being connected to said source and said second end of each coil being connected together, and second means connected to said second ends for indicating the absorption of said microwave signals and the passing of said microwave signals.

9. A ferriresonant logic system as recited in claim 8, wherein each of said toroids is selectively magnetized to a first stable state of remnant magnetization or to a second opposite stable state of remnant magnetization.

10. A ferriresonant logic system comprising, a plurality of ferrite toroids being formed with an inner bore and an outer wall, a drive wire threading at least one of said toroids in a first direction and at least one other of said toroids in an opposite direction, said drive wire being employed to magnetize said one of said toroids in a first state of magnetization and said other of said toroids in an opposite state of magnetization, each of said magnetized toroids having a gyromagnetic resonant absorption frequency, a source of microwave signals operating substantially at said frequency, a helical coil wrapped around said outer wall of each toroid and being formed with a first end and a second end, one state of magnetization of each toroid being representative of the true condition of a logical function and said opposite state of magnetization in the same toroid being representative of the complement of the same logical function, said toroid in one state absorbing said microwave signals and said toroid in said opposite state passing said microwave signals substantially undiminished therethrough, said first end of each coil being connected to said source and said second end of each coil being connected together, and second means connected to said second ends for indicating the absorption of said microwave signals and the passing of said microwave signals.

References Cited

UNITED STATES PATENTS

| | | | |
|---|---|---|---|
| 2,911,554 | 11/1959 | Kompfner et al. | 333—24 XR |
| 2,994,842 | 8/1961 | Treuhaft | 333—1.1 |
| 3,155,941 | 11/1964 | Mims | 340—173 |

OTHER REFERENCES

Kriz, T. A., Microwave Readout of Ferrite Memory Storage, IEEE Transaction on Electronic Computers, February 1965, pp. 75–76.

BERNARD KONICK, *Primary Examiner.*

G. M. HOFFMAN, *Assistant Examiner.*

U.S. Cl. X.R.

340—173, 174